(12) United States Patent
Lai et al.

(10) Patent No.: US 11,686,973 B2
(45) Date of Patent: Jun. 27, 2023

(54) OPTICAL FILM, BACKLIGHT MODULE, AND DISPLAY DEVICE

(71) Applicant: Radiant Opto-Electronics Corporation, Kaohsiung (TW)

(72) Inventors: Chun-Hau Lai, Kaohsiung (TW); Wei-Hsuan Chen, Kaohsiung (TW); Yung-Hui Tai, Kaohsiung (TW); Chun-Yi Wu, Kaohsiung (TW); Yuan-Chen Chung, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 17/736,179

(22) Filed: May 4, 2022

(65) Prior Publication Data

US 2023/0050100 A1 Feb. 16, 2023

Related U.S. Application Data

(63) Continuation of application No. PCT/CN2021/111964, filed on Aug. 11, 2021.

(51) Int. Cl.
*G02F 1/1335* (2006.01)
*G02F 1/13357* (2006.01)

(52) U.S. Cl.
CPC .. *G02F 1/133607* (2021.01); *G02F 1/133603* (2013.01)

(58) Field of Classification Search
CPC ............ G02F 1/133607; G02F 1/133603
See application file for complete search history.

(56) References Cited

U.S. PATENT DOCUMENTS

| 10,209,410 B2* | 2/2019 | Tai ................. G02B 5/0263 |
| 10,359,558 B2* | 7/2019 | Tai ................. G02B 6/0061 |
| 2002/0054424 A1* | 5/2002 | Miles .................. G02B 6/43 359/291 |
| 2013/0106918 A1* | 5/2013 | Bita .................. G02B 6/005 359/290 |
| 2016/0018635 A1* | 1/2016 | Adachi ................ B81B 7/02 359/228 |
| 2016/0033707 A1* | 2/2016 | Lee .................. G02B 6/0038 362/618 |
| 2021/0132422 A1 | 5/2021 | Kim et al. |

FOREIGN PATENT DOCUMENTS

| CN | 102109101 A | 6/2011 |
| CN | 108227276 A | 6/2018 |
| CN | 109061945 A | 12/2018 |

(Continued)

*Primary Examiner* — Mary Ellen Bowman

(57) ABSTRACT

An optical film includes a substrate layer and a plurality of optical layers stacked on the substrate layer. The at least two optical layers have microstructures that complement to each other. The optical layer close to the substrate layer is the first optical layer, and the optical far from the substrate layer is the second optical layer. The refractive index of the first optical layer is smaller than the second optical layer, and the microstructure of the second optical layer has an acute angle. Because of the arrangement of the optical layers, the contrast of light intensity can be reduced, and the uniformity can be improved. The invention also provides a backlight module and a display device including the optical film.

14 Claims, 11 Drawing Sheets

(56) References Cited

FOREIGN PATENT DOCUMENTS

| | | |
|---|---|---|
| CN | 109358447 A | 2/2019 |
| CN | 109407187 A | 3/2019 |
| CN | 111722433 A | 9/2020 |
| CN | 112902111 A | 6/2021 |
| TW | 201409135 A | 3/2014 |
| TW | 202111402 A | 3/2021 |
| WO | 2020062584 A1 | 4/2020 |

* cited by examiner

OPTICAL FILM, BACKLIGHT MODULE, AND DISPLAY DEVICE

RELATED APPLICATIONS

This application is a continuation application of International Application No. PCT/CN2021/111964, filed on Aug. 11, 2021. The entire disclosures of all the above applications are hereby incorporated by reference.

FIELD OF THE INVENTION

The present invention relates to an optical element, and especially to an optical film capable of improving uniformity, and a backlight module and a display device comprising the optical film.

BACKGROUND OF THE INVENTION

The backlight module of the conventional liquid crystal display is disposed on the back of the liquid crystal panel to provide the light source for the liquid crystal panel.

According to the position of the light source, the backlight module can be categorized into "side-lit type" and "direct-lit type". The "direct-lit type" of the backlight module uses multiple LEDs as the light source to replace the traditional incandescent lamp or fluorescent lamp. When the LEDs are used as the light source, a diffuser plate or other optical film is usually set at the top of the light source with a light-spreading distance, and under the liquid crystal panel to provide a uniform surface light source.

However, in practice, the light emitted from each LED has the maximum light intensity in the normal direction, therefore the orthographic projection area of each LED will form a bright spot on the light-emitting surface of the backlight module, causing uneven brightness of the surface light source.

SUMMARY OF THE INVENTION

One object of the present invention is to provide an optical film with reduced thickness and better uniformity.

The optical film comprising a substrate layer and at least two optical layers stacked on the substrate layer. Each of the at least two optical layers have microstructures that complement to each other, wherein the optical layer which closer to the substrate layer is the first optical layer, and the optical layer which farther from the substrate layer is the second optical layer, the refractive index of the first optical layer is smaller than the refractive index of the second optical layer, and at least the microstructure of the second optical layer has an acute angle.

In a preferable embodiment, the microstructure of the first optical layer has a first angle, the microstructure of the second optical layer has a second angle, and the first angle is equal to the second angle.

In a preferable embodiment, the microstructure of the first optical layer has a first angle, the microstructure of the second optical layer has a second angle, and the first angle is not equal to the second angle.

In a preferable embodiment, the microstructure of the first optical layer has a first angle, the microstructure of the second optical layer has a second angle, wherein at least one of the first angle and the second angle is between 40 degrees and 70 degrees, and includes endpoint values.

In a preferable embodiment, the optical layers have a light-emitting surface opposite to the substrate layer, and the light-emitting surface is a smooth surface.

In a preferable embodiment, there is at least one microstructure interface between the optical layers and which is formed between the microstructures of adjacent optical layers.

In a preferable embodiment, there is a microstructure interface between the substrate layer and the first optical layer.

In a preferable embodiment, the refractive index of the first optical layer attached to the substrate layer is smaller than the refractive index of the substrate layer.

In a preferable embodiment, an encapsulating layer is provided on the other side of the substrate layer opposite to the optical layers.

Another object of the present invention is to provide a backlight module.

The backlight module comprising a light source and the optical film as described above to receive the light emitted from the light source.

In a preferable embodiment, the light source includes a circuit board, a plurality of light-emitting diodes disposed on the circuit board at intervals, and an encapsulating layer disposed on the circuit board and covering the light-emitting diodes.

The backlight module comprising a light source and the optical film as described above to receive the light emitted from the light source, wherein the light source includes a circuit board and a plurality of light-emitting diodes disposed on the circuit board at intervals, and wherein the encapsulating layer of the optical film covers the light-emitting diodes.

Another object of the present invention is to provide a display device.

The display device includes the backlight module as described above, and a display panel arranged on the backlight module.

According to the arrangement of the optical layers in the present invention, the contrast of the area light source can be reduced and the uniformity can be improved.

DETAILED DESCRIPTION OF THE INVENTION

The detailed description and preferred embodiments of the invention will be set forth in the following content and provided for people skilled in the art to understand the characteristics of the invention.

Figure 1:
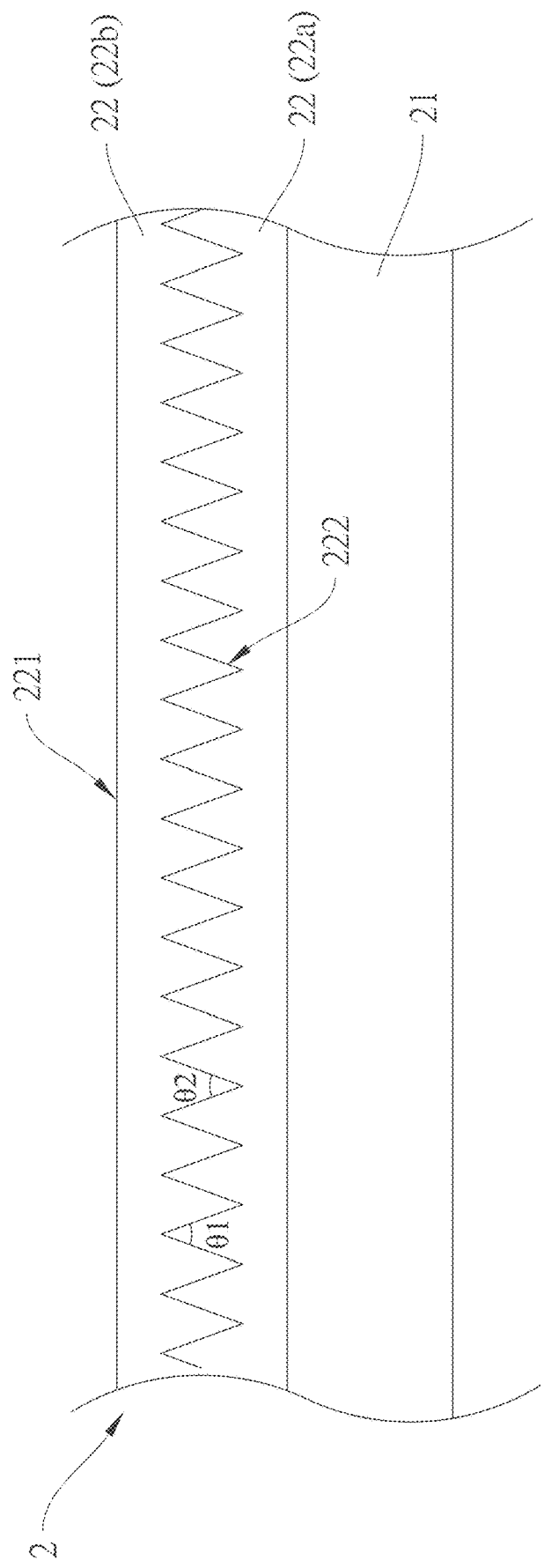
FIG. 1 is a schematic diagram of an optical film according to an embodiment of this invention.
Figure 11:
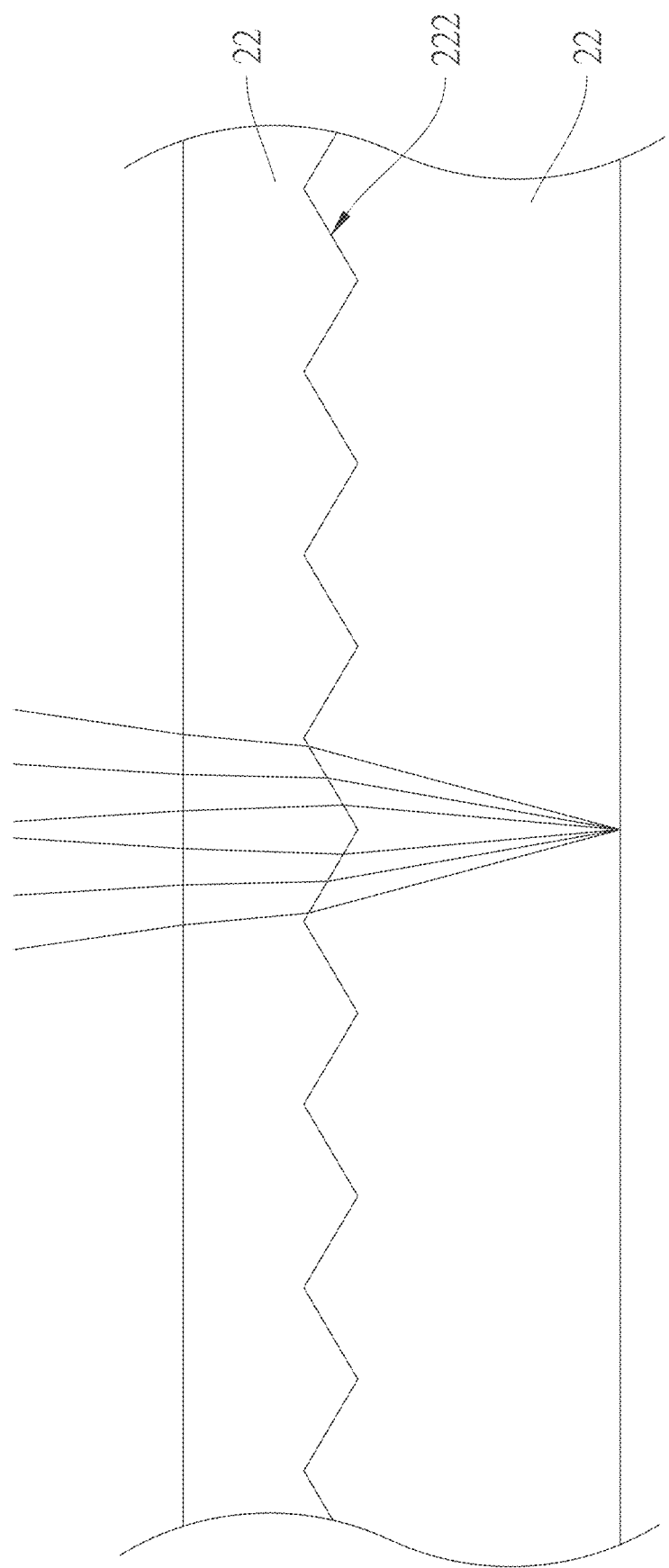
FIG. 11 is a schematic diagram illustrating a light path in an optical film with a single microstructure interface which formed by obtuse angle microstructures.

Referring to FIG. 1, it is a preferred embodiment of the optical film 2 of the present invention. The optical film 2 comprises a substrate layer 21, and a plurality of optical layers 22 stacked on the substrate layer 21. The optical layers 22 has a light-emitting surface 221 opposite to the substrate layer 21 and at least one microstructure interface 222. Preferably, the microstructure interface 222 can be disposed between the optical layers 22 or disposed at the interface between the substrate layer 21 and the optical layers 22. The microstructure interface 222 includes a plurality of microstructures with acute angle. More specifically, there is a problem of the conventional direct-lit type backlight module, such that the light emitted from the light source disposed under an optical film usually occurs the problem of being too concentrated (such as hotspot). The problem is solved by the optical film 2 of the present invention, which can evenly disperse the light concentrated directly above the light source through the microstructure interface 222 with an acute angle, so that the light is diffused radially around in the optical film 2, and then covering the area where no light source is installed. Therefore, it can not only reduce the number of light sources and production costs, but also reduce the contrast between the light and dark area in the display area of the display device so as to improve the optical quality. Referring to FIG. 11, when the single microstructure interface 222 formed by obtuse angle microstructures, the slope of the microstructure is relatively gentle, and most of the light emitted by the light source will be less deflected after passing through the gentle slope and emitted directly above easier, so that the radiation range is smaller and insufficient to improve the uniformity of the backlight module. It is particularly noted that in an embodiment of the present invention, the at least one microstructure interface 222 is composed of at least two optical layers 22 as a set. In other words, the at least one microstructure interface 222 is located between the two optical layers 22.

Figure 2:
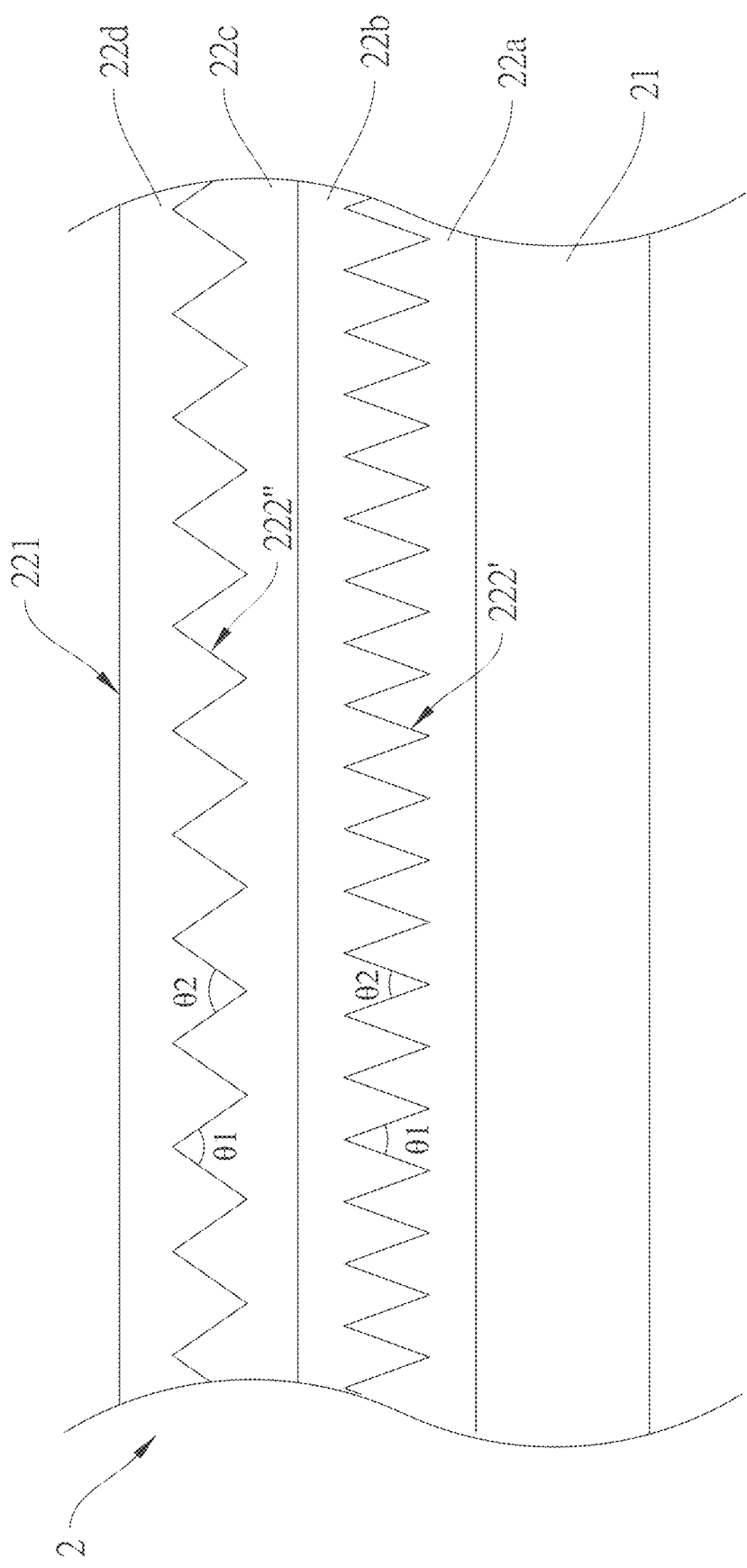
FIG. 2-4 are schematic diagrams showing different types of the optical film.
Figure 3:
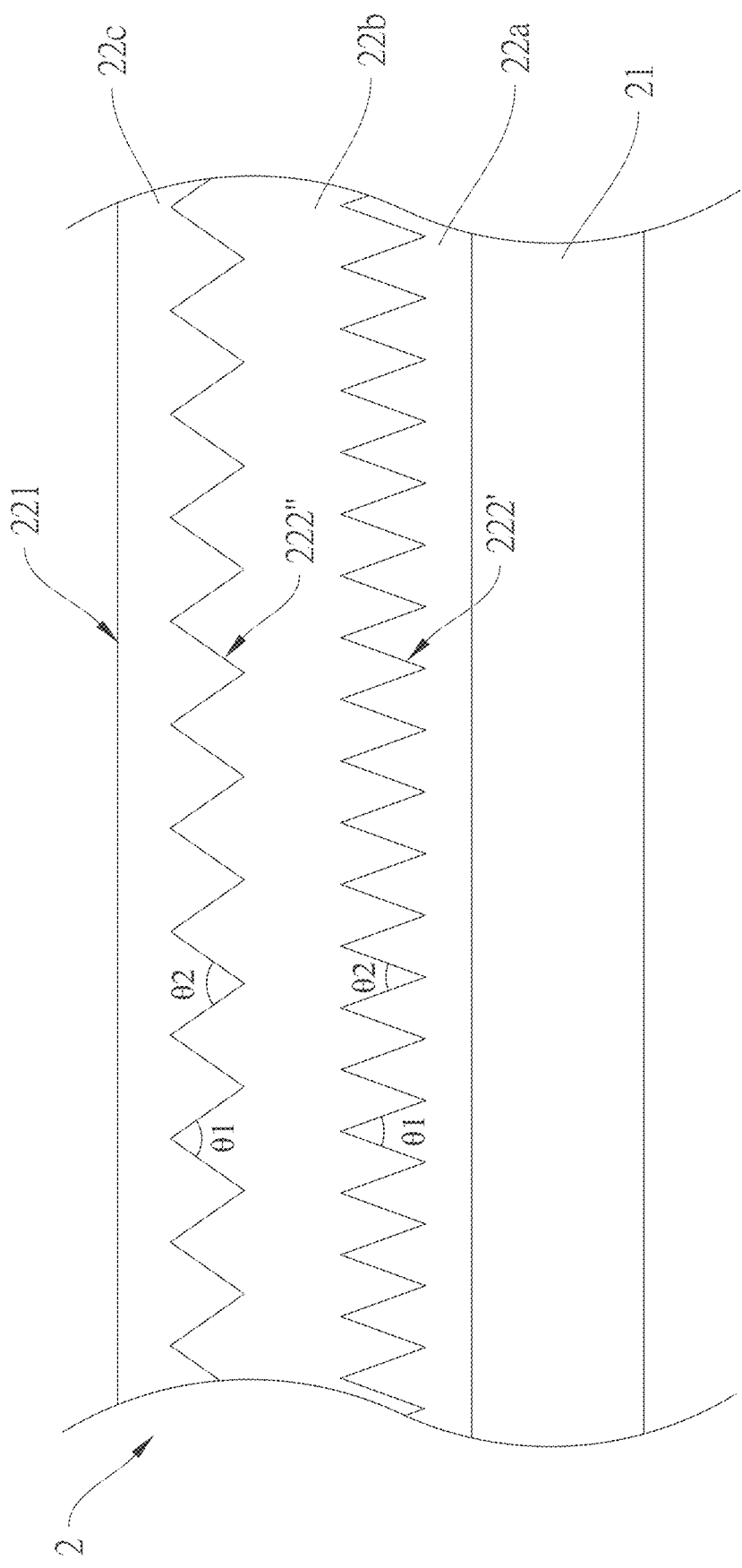

In one embodiment, the material of the substrate layer 21 can be selected from polyethylene terephthalate (PET) with higher hardness to support the formation of the optical layers 22, and which is also beneficial for the transportation of the optical film 2 in the present invention. As shown in FIG. 1, among the optical layers 22, there is a first optical adhesive layer 22a which is closer to the substrate layer 21, and there is a second optical adhesive layer 22b which is farther from the substrate layer 21. The refractive index of the second optical layer 22b is greater than the refractive index of the first optical layer 22a, and the refractive index of the second optical layer 22b is greater than the refractive index of the air. In other words, the difference between the refractive index of the second optical layer 22b and the refractive index of the air (usually equals to 1) is greater than the difference between the refractive index of the first optical layer 22a and the refractive index of the air. The larger difference of the refractive index facilitates to increase the refraction degree of the light emitted from the light emitting surface 221 of the second optical layer 22b. It should be noted that, in a preferred embodiment of the present invention, the optical layers 22 includes at least two optical layers 22a and 22b, and the at least one microstructure interface 222 is located between the optical layers 22a and 22b. For example, as shown in FIG. 1, the number of the optical layers 22 is an even number, and there is a microstructure interface 222 between the optical layers 22a and 22b. Alternatively, as shown in FIG. 2, there may be four layers of optical layers 22a, 22b, 22c, and 22d, wherein there is a microstructure interface 222' located between one group of the optical layers 22a and 22b, and another microstructure interface 222" located between the other group of the optical layers 22c and 22d. The microstructure interfaces 222', 222" between the two groups of optical layers are formed separately, and then the two groups of optical layers are stacked to each other and formed a plane interface in between. Or as shown in FIG. 3, there are three layers of optical layers 22a, 22b, and 22c, and two microstructure interfaces 222', 222" are formed between the two adjacent layer in sequence. No matter which type of the microstructure interface shown in FIG. 1, FIG. 2, or FIG. 3, the interface between the light-emitting surface 221 and the air can be selected as a smooth plane or a rough plane, which is helpful for the light in the optical layers 22 radiates outward evenly from the light-emitting surface 221. In another preferred embodiment, such as shown in FIG. 2 or FIG. 3, there is a different angle of the microstructures that located in different microstructure interfaces 222. More specifically, the angle of the microstructures in one microstructure interface which is closer to the light source is smaller, preferably an acute angle. The angle of the microstructure in another microstructure interface which is closer to the light-emitting surface 221 is larger, and the angle is not limited to an acute angle, a right angle, or an obtuse angle.

Figure 4:
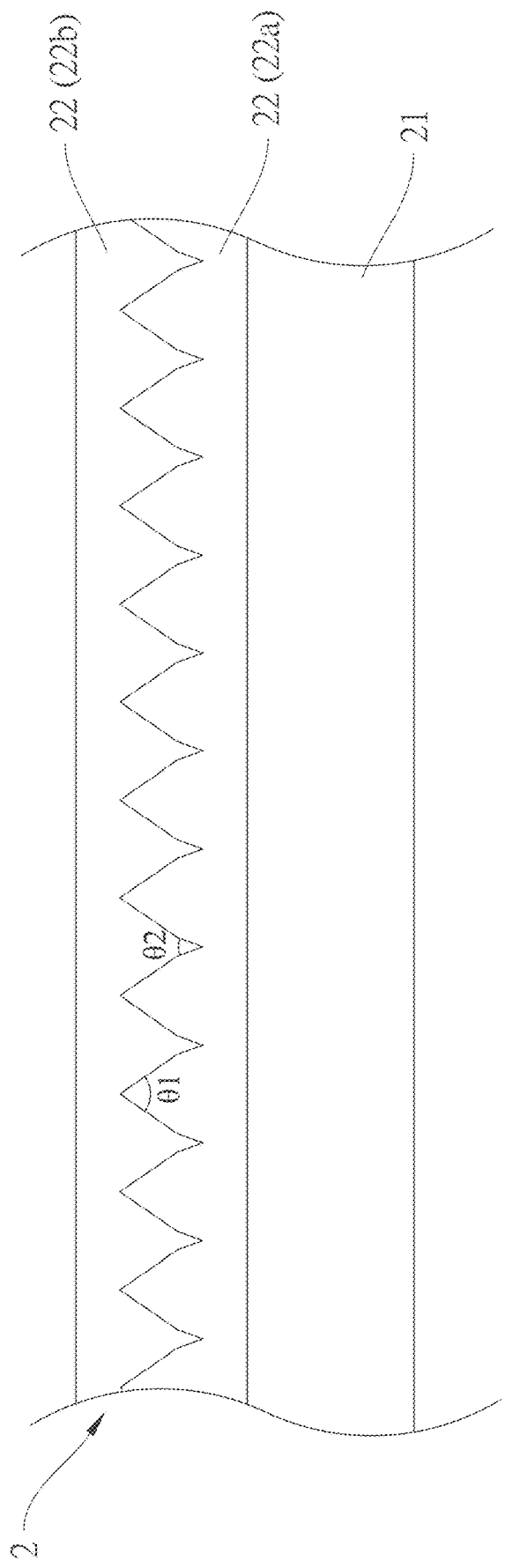

In one embodiment, the microstructure of the microstructure interface 222 has an acute angle which locates between the first adhesive layer 22a and the second optical layer 22b. The microstructure of the first optical layer 22a has a first angle θ1, and the microstructure of the second optical layer 22b has a second angle θ2, wherein at least the second angle θ2 is an acute angle, and the first angle θ1 and the second angle θ2 can be the same or different. In one condition, the two angles are the same, the design of the mold is less difficult, which facilitates to reduce the production time. In another condition, the two angles are different, the microstructures at different angles can fine-tune the proportion of the refract light. In FIG. 1 and FIG. 2, the first angle θ1 is equal to the second angle θ2. In some embodiments, as shown in FIG. 4, the first angle θ1 is greater than the second angle θ2. No matter which type of FIG. 1, FIG. 2, or FIG. 4, whomever in the microstructure interface 222 is closer to the light source, there is at least one angle of the first angle θ1 and the second angle θ2 is between 40 degrees and 70 degrees, and which including endpoint values. In the following content, FIG. 1 will be illustrated as an example for following description.

Figure 5:
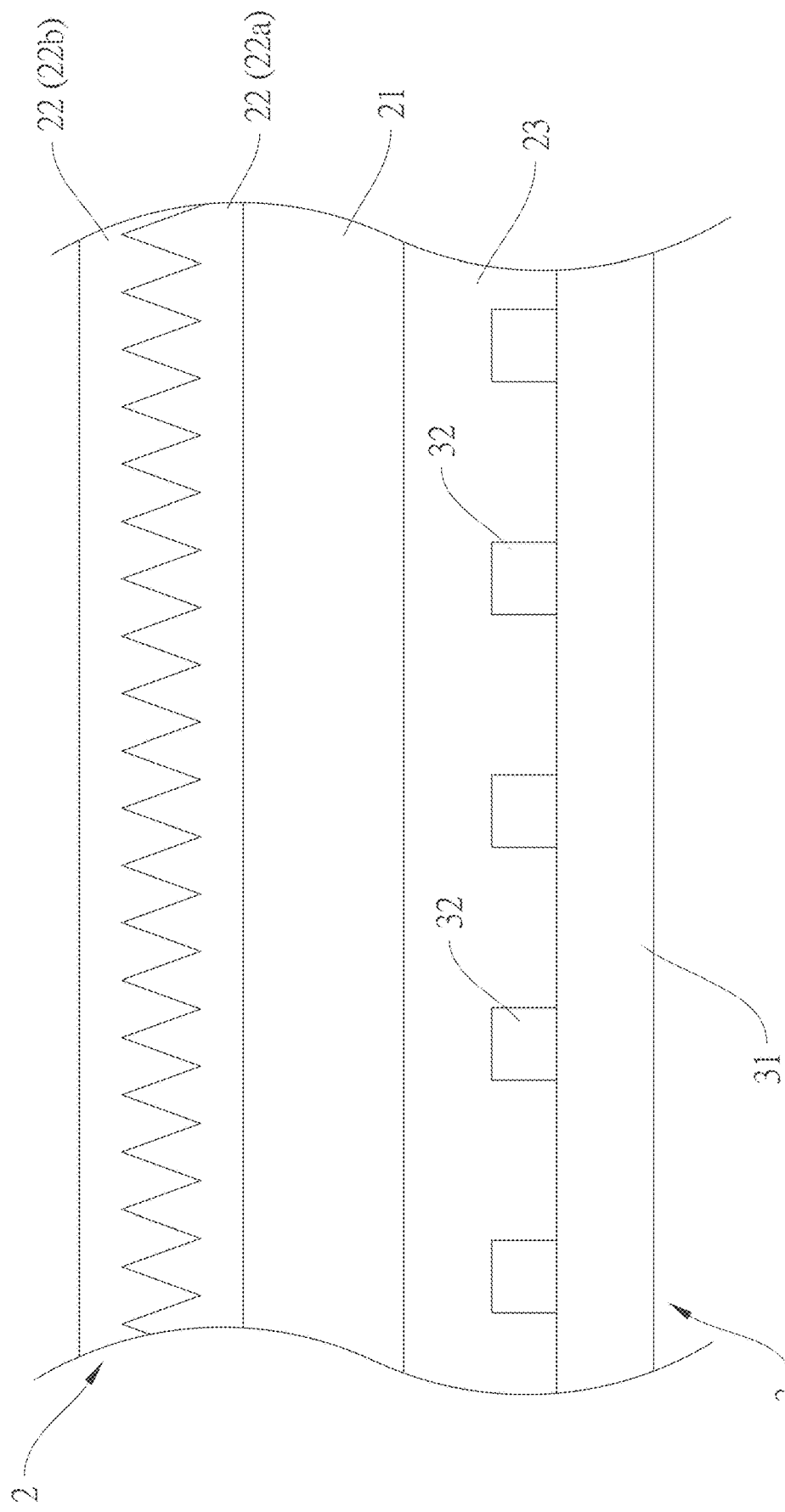
FIG. 5 is a schematic diagram of a backlight module according to an embodiment of this invention.

Referring to FIG. 5, it is a preferred embodiment of the backlight module of the present invention, which includes an optical film 2 as shown in FIG. 1, and a light source 3. The light source 3 is located under the optical film 2, and the light source 3 includes a circuit board 31 and a plurality of light-emitting diodes 32 arranged on the circuit board 31 at intervals. The light-emitting diodes 32 emit light toward the optical film 2. The light passes through the substrate layer 21 and the first optical layer 22a and the second optical layer 22b of the optical film 2 in sequence, and then be emitted from the light-emitting surface 21. It is optional that an encapsulant layer 23 is provided on a side of the substrate layer 21 of the optical film 2 and the side is opposite to the optical layers 22. The encapsulant layer 23 can prevent the light-emitting diodes 32 exposed to air or moist environment.

Figure 6:
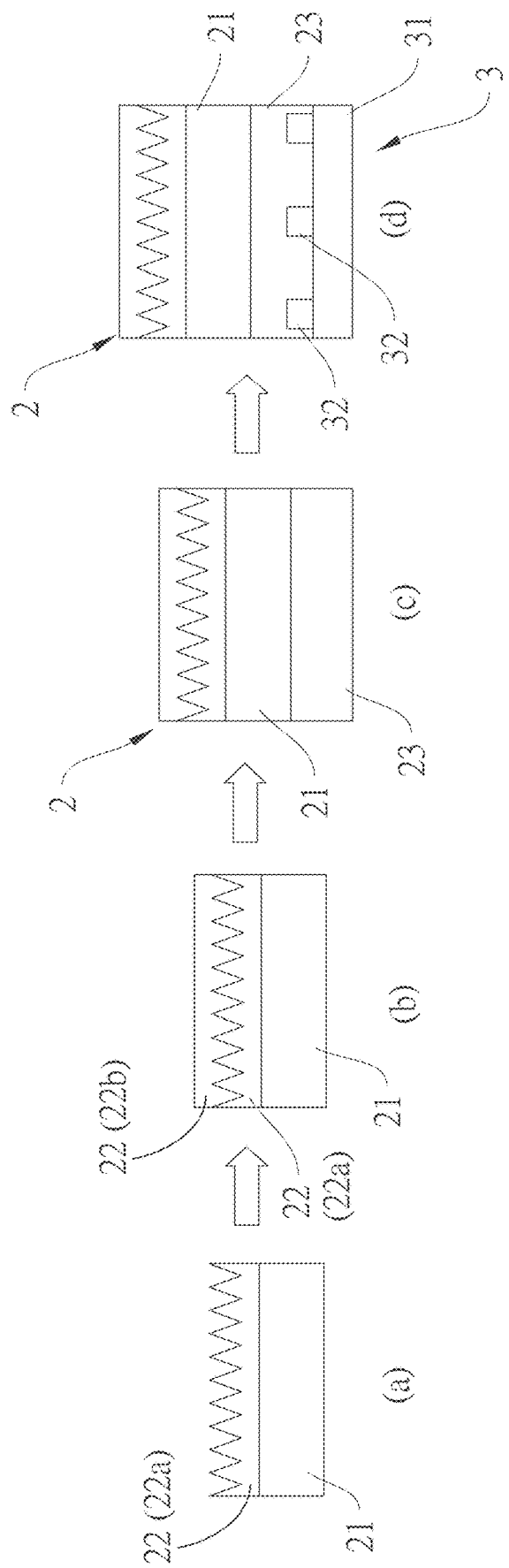
FIG. 6 is a flow chart illustrating the manufacturing process of the optical film.
Figure 7:
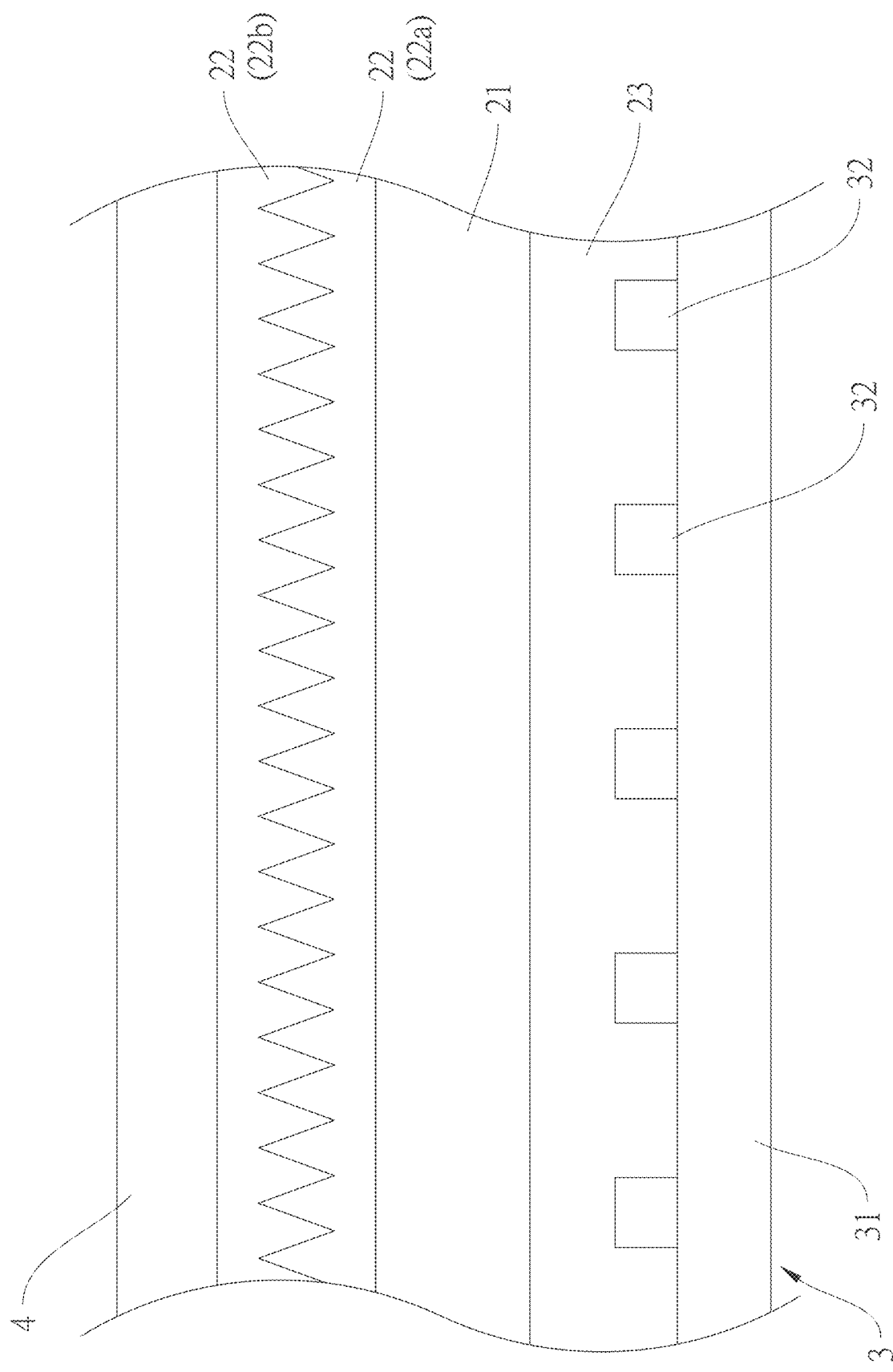
FIG. 7 is a schematic diagram of a display device according to an embodiment of this invention.

Referring to FIG. 6, there is the manufacturing illustration of the backlight module and the optical film 2 of the present invention. As shown in FIG. 6(a), the first optical layer 22a is disposed on one side of the substrate layer 21 first. As shown in FIG. 6(b), the second optical layer 22b is disposed on the first optical layer 22a. From the viewing angle of FIG. 6(b), the microstructures of the first optical layer 22a are acute-angle structures protruding upward, and the microstructures of the second optical layer 22b are acute-angle structures protruding downward and filled in gaps of the microstructures of the first optical layer 22a. Therefore, the microstructures of the first optical layer 22a and the microstructures of the second optical layer 22b are complementary to each other. As the manufacturing process of FIG. 6(a) to FIG. 6(b), the basic form of the optical film 2 of the present invention is obtained. As shown in FIG. 6(c), the other side of the substrate layer 21 is further provided with the encapsulant layer 23. It is optional that the encapsulant layer 23 is jelly-like before curing. As the manufacturing process proceeds of FIG. 6(c), another type of the optical film 2 of the present invention is obtained. Since the encapsulant layer 23 is jelly-like before curing, it is beneficial for transportation, simplification of the assembly procedure of the backlight module, and shortening the manufacturing process. Next, as shown in FIG. 6(d), the encapsulant layer 23 is pressed to attach the circuit board 31, so that the light-emitting diodes 32 are embedded in the encapsulant layer 23. After the curing process, such as pressure degassing, UV exposure, etc., the encapsulant layer 23 is cured, so that the optical film 2 and the circuit board 31 are firmly combined. It should be noted that, there is another method to form the encapsulant layer 23. Since the optical film 2 of FIG. 6(b) is obtained, liquid encapsulant is applied on the circuit board 31 and make it flow over the light-emitting diodes 32. After being heated and cured, the formation of the encapsulant layer 23 is complete. That is to say, the formation of the encapsulant layer 23 is optional that the encapsulant layer 23 is disposed directly on the substrate layer 21 or the encapsulant layer 23 is formed by dispensing when combined with the light source 3. Finally, as shown in FIG. 7, a display panel 4 is disposed above the second optical adhesive layer 22b to obtain a display device.

For the above structural design, the light emitted by the light-emitting diodes 32 will pass through the encapsulant layer 23 and enter the substrate layer 21. In one side of the substrate layer 21, such as the light-entering side, since the mediums of the encapsulant layer 23 and the substrate layer 21 are different, the efficiency of light-emitting from the light-emitting diodes can be facilitated that the refractive index of the encapsulant layer 23 and the refractive index of the substrate layer 21 are approximative to the refractive index of the light-emitting diodes. In the other side of the substrate layer 21, such as the light-emitting side, the refractive index of the first optical layer 22a is smaller than the refractive index of substrate layer 21. It facilitates the emitting angle of the light which emitted from the substrate layer 21 radiates more outward than the entering angle of the light which entering the substrate layer 21.

Figure 8:
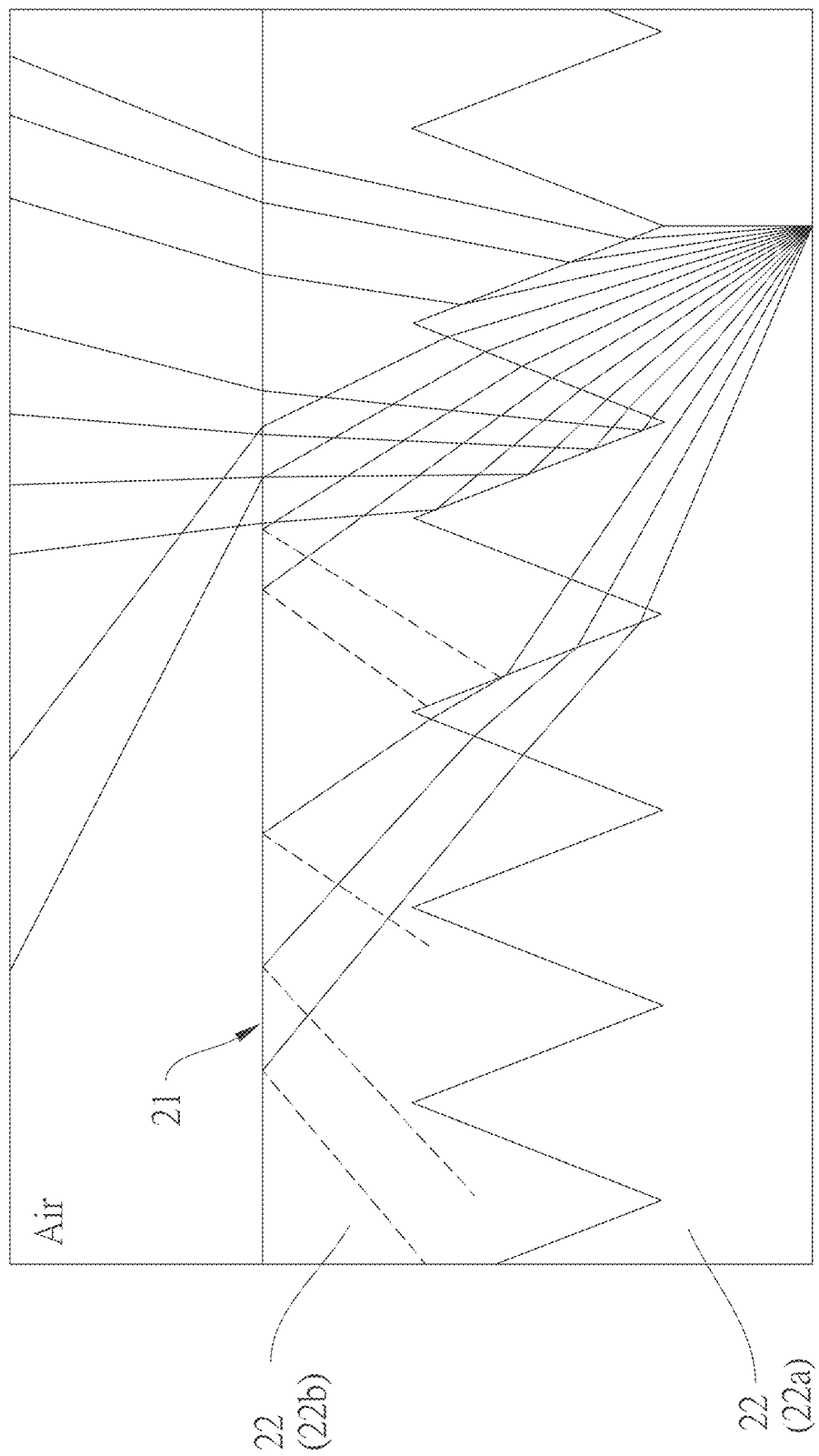
FIG. 8 is a schematic diagram illustrating the light path in the optical film shown in the FIG. 1.

Referring to FIG. 8, when the light enters the second optical layer 22b from the first optical layer 22a, the light will pass through the interface between the first optical layer 22a and the second optical layer 22b. By the structure of the acute angle of the microstructure, part of the light emitted by the light-emitting diodes 32 which set underneath the optical layers 22 can be refracted away to reduce the light along the normal line and reduce the amount of direct light output. Furthermore, since the refractive index of the first optical layer 22a is smaller than the refractive index of the second optical layer 22b, the deflection angle of the emitted light can be increased to improve the uniformity of light-emitting surface. In addition, the refractive index of the second optical layer 22b is greater than the refractive index of the air. Therefore, the larger difference between the refractive index of the second optical layer 22b and the refractive index of air is used to ensure that the light can be deflected effectively at a large angle which emitted from the light-emitting surface 221 of the second optical layer 22b.

In more detail, in FIG. 8, when the light emitted by the light-emitting diodes 32 (shown in FIG. 6) enters the first adhesive layer 22a, the amount of the light emitted along the normal line can be refracted by the acute-angle microstructure of the second optical layer 22b, so as to reduce the amount of the light which directly emitted along the normal line. That is to say, the acute-angle structure of the second optical layer 22b is a relatively steep slope, and the light emitted by the light source passes through the steep slope with a larger deflection angle, so the amount of the light emitted from the light-emitting diodes 32 along the normal line can be reduced, and the uniformity of the light emitting surface can be improved. In one hand, when the light enters the second optical layer 22b from the first optical layer 22a, although the light path is from a medium with a smaller refractive index to a medium with a larger refractive index, it makes the emitting angle of the light is smaller than the incident angle of the light. On the other hand, the optical film 2 of the present invention utilizes the optical refraction characteristics of different medium of the microstructure interface 222 to increase the deflection range of the light along the radiation direction, so as to solve the problem of hotspots along the normal line. Then, when the light enters the air from the second optical layer 22b, some of the light will be deflected outward and then emitted from the light-emitting surface 21 due to the large difference in the refractive index between the second optical layer 22b and the air, while some of the light whose entering angle is greater than the critical angle (such as the dotted line shown in FIG. 8) will be reflected back to the second optical layer 22b and transmitted in the second optical layer 22b continually, thereby improving the uniformity of the optical film 2. In this way, the amount of light emitted from the light-emitting diodes 32 and along the normal line not only can be reduced, but the light also can be diffused radially around and covers the area without setting the light-emitting diodes 32. So that, it can not only reduce contrast of light and dark area in the display area of the display device, but also can reduce the number of light-emitting diodes 32 disposed in the display device.

Figure 9:
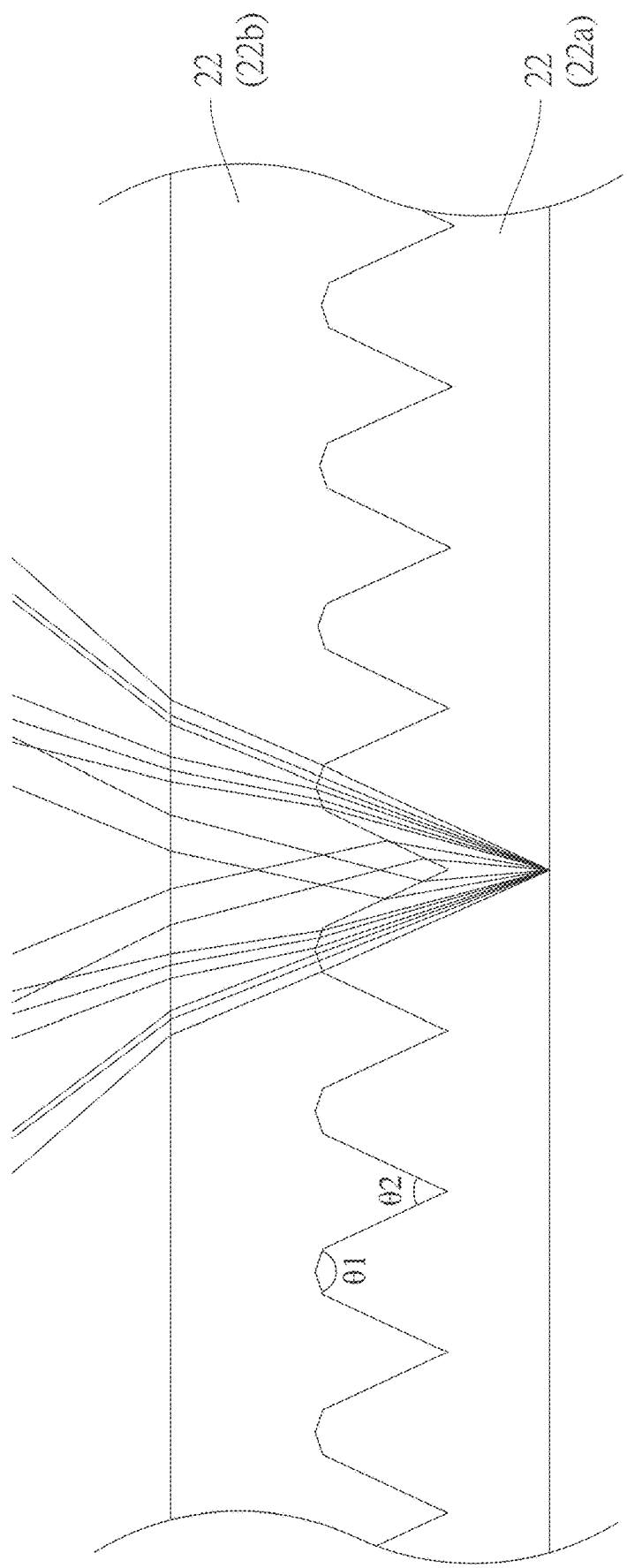
FIG. 9 is a schematic diagram illustrating the light path in the optical film shown in the FIG. 4.

Referring to FIG. 9, in another embodiment, when each of the microstructures of the first optical layer 22a has a first angle θ1 that is an obtuse angle, and each of the microstructures of the second optical layer 22b has a second angle θ2 that is an acute angle, the slope of the microstructure with the acute angle of the second optical layer 22b is steeper, and the light emitted by the light source will be deflected to a greater angle after passing through the steeper slope. Therefore, part of the light is deflected outward in a larger angle to reduce the proportion of the light emitted directly above to improve the uniformity of the backlight module. On the other hand, the obtuse-angled microstructures of the first optical layer 22a have relatively gentle slopes. The light emitted by the light source is deflected outward with a small degree after passing through the gentle slopes. The proportion of the light emitted along the normal line can be fine-tuned according to the ratio of the obtuse-angle microstructure's slope to the acute-angle microstructure's slope. For example, the larger the proportion of the obtuse-angle microstructure's slope, the stronger the effect of compensating the light emitted above.

The example A and the example B in the following table are different combination of two optical layers 22 with different refractive indices. The refractive index differences of the two optical layers of the two combinations are ΔnA=0.211 and ΔnB=0.33 respectively. Example A and example B are compared with their respective control groups (that is, the optical layers with the same refractive index difference are selected, but without the microstructure interface).

| light intensity ratio | Angle of microstructure(θ) | | | | |
|---|---|---|---|---|---|
| | 30° | 40° | 50° | 60° | 70° |
| example A ΔnA (=0.211) | 0.93 | 0.62 | 0.54 | 0.63 | 0.74 |
| example B ΔnB (=0.33) | 1.22 | 0.65 | 0.45 | 0.48 | 0.62 |

Figure 10:
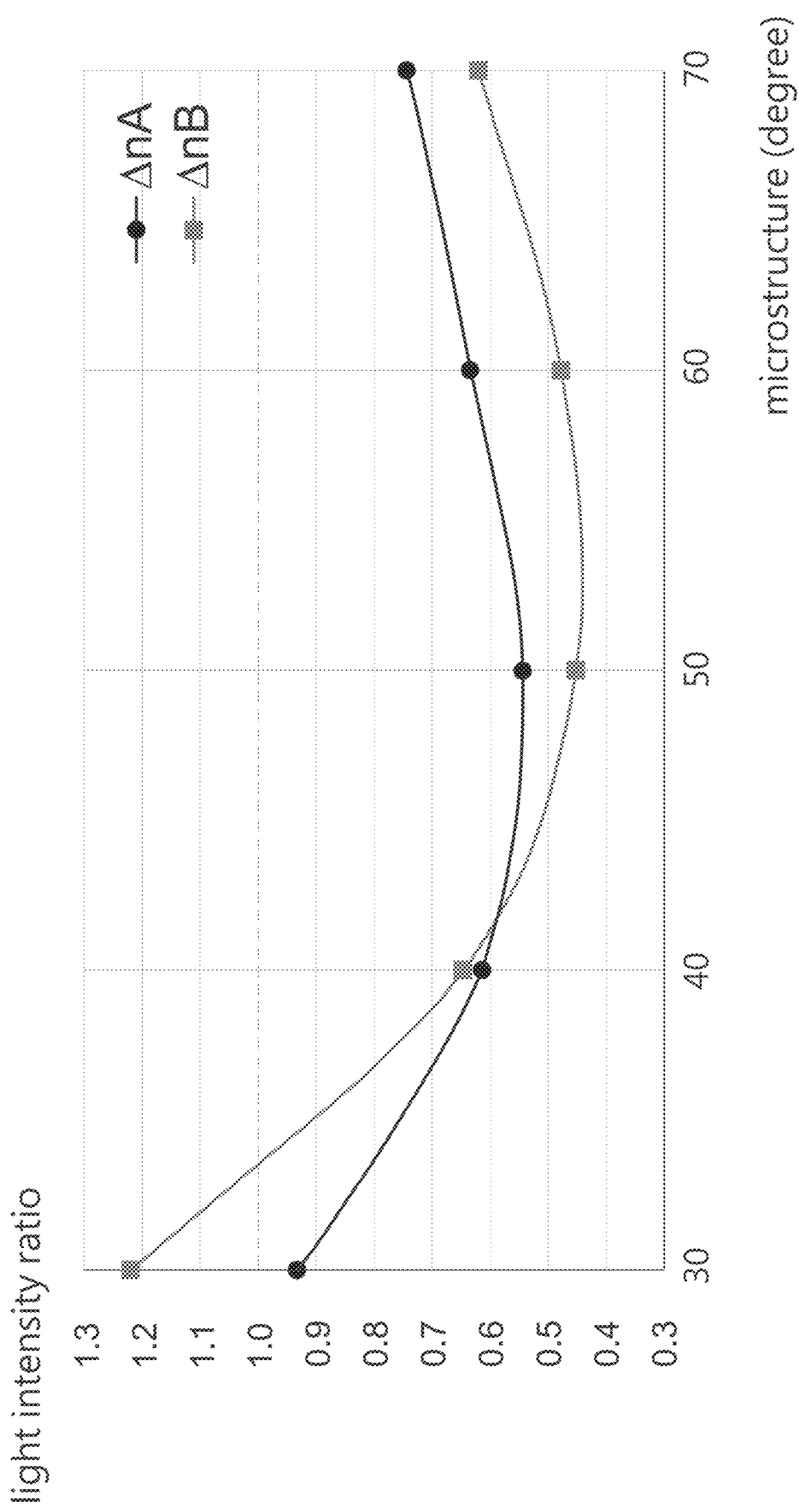
FIG. 10 is a curve diagram illustrating the effect on the light contrast of the optical layer with the combination of different refractive index.

Taking example A and its control group as an example. First, obtaining the light intensity difference ΔL of the control group of example A. The light intensity difference ΔL refers to the difference between the strongest luminance and the weakest luminance (ΔL=Lmax−Lmin). In example A, the light intensity difference measured at different microstructure angles was used as the numerator, and the light intensity difference in the control group A was used as the denominator, and the light intensity ratio of example A at different microstructure angles was calculated and shown as the line ΔnA in FIG. 10. The light intensity ratio of the control group is 1 (shown as dashed line in FIG. 10). As shown in FIG. 10 and the table above, in example A, the refractive index of the first optical layer is 1.477, while the refractive index of the second optical layer is 1.688, and ΔnA is 0.211. In the microstructure angle range of 30 degree to 70 degrees, as the microstructure angle increases, the light intensity ratio is decreased from 0.93 at 30 degrees to 0.54 at 50 degrees, and there is an inflection point in the curve and then the light intensity ratio increased to 0.74 at 70 degrees.

The light intensity difference of Example B and its control group is obtained by the above method and shown as the line ΔnB in FIG. 10. In Example B, the refractive index of the first optical layer is 1.37, the refractive index of the second optical layer is 1.7, and ΔnB is 0.33. In the microstructure angle range of 30 degrees to 70 degrees, as the microstructure angle increases, the light intensity ratio is decreased from 1.22 at 30 degrees to 0.45 at 50 degrees, and there is an inflection point in the curve and then the light intensity ratio increased to 0.62 at 70 degrees.

It can be seen from the above results that when the difference in refractive index between the optical layers 22 is relatively small (such as in example A), the light intensity and the uniformity of light contrast can be improved as long as there is a microstructure interface between the optical layers 22. When the difference in refractive index between the optical adhesive layers 22 is relatively large (such as in example B), the contrast of light and dark area in the display area can be fine-tuned with the angle of the microstructures. That is, when the refractive index difference is large, if the angle of the microstructure is too small, for example, less than 30 degrees, the uniformity is not good enough. In other words, the angle of the microstructures of the first optical layer 22a and the second optical layer 22b is designed to be in the range of 40 degrees to 70 degrees, which can reduce the contrast of the light intensity, thereby making a better optical quality of the display device.

The present invention can not only reduce the amount of light emitted from the light-emitting diodes 32 and along the normal line by the above-mentioned structural design and the difference in the refractive index of the optical layers 22, but also can make the light be diffused radially to the surroundings and cover the area without setting the light-emitting diodes 32. Furthermore, the present invention can increase the spacing between the light-emitting diodes 21 and reduce the number of the light-emitting diodes 32 without affecting the luminance and can reduce the production cost. It can also reduce the contrast of light and dark area in the display area of the display device and make the display device have better uniformity and improve the optical quality.

What is claimed is:

1. An optical film, comprising:
   a substrate layer; and
   at least two optical layers, which are stacked on the substrate layer and have complementary microstructures filled with each other, wherein the optical layer which closer to the substrate layer is the first optical layer, and the optical layer which farther from the substrate layer is the second optical layer, the refractive index of the first optical layer is smaller than the refractive index of the second optical layer, and the microstructure of the second optical layer has an acute angle.

2. The optical film as claimed in claim 1, wherein the microstructure of the first optical layer has a first angle, the microstructure of the second optical layer has a second angle, and the first angle is equal to the second angle.

3. The optical film as claimed in claim 1, wherein the microstructure of the first optical layer has a first angle, the microstructure of the second optical layer has a second angle, and the first angle is not equal to the second angle.

4. The optical film as claimed in claim 1, wherein the microstructure of the first optical layer has a first angle, the microstructure of the second optical layer has a second angle, wherein at least one of the first angle and the second angle is between 40 degrees and 70 degrees and includes the endpoint values.

5. The optical film as claimed in claim 1, wherein the optical layers have a light-emitting surface opposite to the substrate layer, and the light-emitting surface is a smooth surface.

6. The optical film as claimed in claim 1, wherein there is at least one microstructure interface between the optical layers, and which is formed between the microstructures of adjacent optical layers.

7. The optical film as claimed in claim 6, wherein there is a microstructure interface between the substrate layer and the first optical layer.

8. The optical film as claimed in claim 1, wherein the refractive index of the first optical layer attached to the substrate layer is smaller than the refractive index of the substrate layer.

9. The optical film as claimed in claim 1, wherein an encapsulating layer is provided on the other side of the substrate layer opposite to the optical layers.

10. A backlight module, comprising:
    a light source; and
    the optical film as claimed in claim 1 to receive the light emitted from the light source.

11. The backlight module as claimed in claim 10, wherein the light source includes a circuit board, a plurality of light-emitting diodes disposed on the circuit board at intervals, and an encapsulating layer is disposed on the circuit board and covers the light-emitting diodes.

12. A backlight module, comprising:
a light source, which includes a circuit board, and a plurality of light-emitting diodes disposed on the circuit board at intervals; and
the optical film as claimed in claim 9 to receive the light emitted from the light source, wherein the encapsulant layer covers the light-emitting diodes.

13. A display device, comprising the backlight module as claimed in claim 10, and a display panel arranged on the backlight module.

14. A display device, comprising the backlight module as claimed in claim 12, and a display panel arranged on the backlight module.

* * * * *